Patented May 12, 1953

2,638,420

UNITED STATES PATENT OFFICE 2,638,420

PROCESS FOR THE PREPARATION OF A STABLE BUTTER

Frederik Dirk Tollenaar, Utrecht, Netherlands, assignor to de Nederlandse Organisatie voor Toegepast-Natuurwetenschappelijk Onderzoek ten behoeve van de Voeding, The Hague, Netherlands, a corporation of the Netherlands No Drawing. Application June 15, 1951, Serial No. 231,893. In the Netherlands June 21, 1950

15 Claims. (Cl. 99—164)

In cold storage butter an off-flavour develops which is often called fishy.

The invention relates to a process for the prevention of the flavour deterioration in butter in cold storage.

Most of the usual antioxidants have only little value for the prevention of fishiness in storage butter. Phenolic antioxidants, active in the prevention of normal rancidity due to autoxidation of oils and fats, give scarcely any protection for the prevention of fishiness in storage butter.

It was found that an addition of a quantity of 0.02%–0.0005% of a dialkyldithiocarbamic acid compound to the butter efficiently prevents the off-flavour and fishiness.

The substances may be added in any stage of the process (hence to the milk as well as to the sweet cream, the cream after souring, the butter granules, to the butter itself), and in a quantity corresponding with 0.02%–0.0005% of the butterfat present.

The substance may be added in the form of the acid, but also salts of these acids may be used for this purpose. Special advantage can be attained by the use of sodium salts, since these salts are soluble in water.

Sometimes it can be advantageous to mix the stabilizers before the addition of other substances that also must be added to the butter, e. g. NaCl or butter yellow.

Example I

Before churning 20 g. of the sodium salt of diethyldithiocarbamic acid were added to 1000 l. of soured cream with a fat content of 28%. Butter prepared from this cream in the usual way and salted with 2 kg. of NaCl, had a very good taste and flavour after six months of storage at a temperature of —12° C.; the peroxide number amounted to 0.3 milliequivalents per kg. of fat. Butter, prepared in the same way from the same lot of cream, without addition of the sodium salt of diethyldithiocarbamic acid, however, was obviously fishy after two months of storage; the taste was very disagreeable after a storage of 6 months, the peroxide number then amounting to 3.5 milliequivalents per kg. of fat.

Example II 0.01% of the potassium salt of dimethyldithiocarbamic acid was added to a part of a lot of butter granules, whereas another part was finished without any addition. After salting and kneading the percentage of moisture of the butter amounted to 13%; the percentage of salt to 0.8%. The butter was stored at a temperature of 4° C.; periodically it was tested chemically and organoleptically. The untreated butter had an "oxidation-taste" and a peroxide number of 1.8 after a storage of 6 weeks; the treated butter was still in good condition and the peroxide number amounted to 0.4.

Example III

Before churning 2 g. of copper salt of diethyldithiocarbamic acid were added to 1000 litres of soured cream. After churning and kneading the unsalted butter was stored at a temperature of —12° C. After 3 and after 6 months the peroxide number of this butter amounted to 0.2 resp. 0.3 milliequivalents per kg. of fat, whereas butter prepared from the same cream but to which no antioxidant had been added, had a peroxide number of 0.8 resp. 1.5. The last mentioned butter had the typical oxidation defects (fishy), in contrast to the treated butter.

I claim:

1. As a new article of manufacture, a manufactured butter product having incorporated therein a substance selected from the group consisting of dialkyldithiocarbamic acids and salts thereof, in an amount sufficient to inhibit rancidity and deterioration.

2. As a new article of manufacture, a manufactured butter product having incorporated therein 0.0005–0.02% of a substance selected from the group consisting of dialkyldithiocarbamic acids and salts thereof so as to inhibit rancidity and deterioration.

3. As a new article of manufacture, a manufactured butter product having incorporated therein dimethyldithiocarbamic acid and salts thereof, in an amount sufficient to inhibit rancidity and deterioration.

4. As a new article of manufacture, a manufactured butter product having incorporated therein diethyldithiocarbamic acid and salts thereof, in an amount sufficient to inhibit rancidity and deterioration.

5. As a new article of manufacture, a manufactured butter product having incorporated therein 0.0005–0.02% of dimethyldithiocarbamic acid and salts thereof so as to inhibit rancidity and deterioration.

6. As a new article of manufacture, a manufactured butter product having incorporated therein 0.0005–0.02% of diethyldithiocarbamic acid so as to inhibit rancidity and deterioration.

7. As a new article of manufacture, a manufactured butter product having incorporated therein potassium dimethyldithiocarbamate in an amount sufficient to inhibit rancidity and deterioration.

8. As a new article of manufacture, a manufactured butter product having incorporated therein sodium diethyldithiocarbamate in an amount sufficient to inhibit rancidity and deterioration.

9. As a new article of manufacture, a manufactured butter product having incorporated therein copper diethyldithiocarbamate in an amount sufficient to inhibit rancidity and deterioration.

10. A method of inhibiting rancidity and deterioration of a manufactured butter product which comprises incorporating in a butter product, a small amount, sufficient to inhibit rancidity and deterioration, of a substance selected from the group consisting of dialkyldithiocarbamic acids and salts thereof.

11. A method of inhibiting rancidity and deterioration of a manufactured butter product which comprises incorporating in a butter product, 0.0005–0.02% of a substance selected from the group consisting of dialkyldithiocarbamic acids and salts thereof.

12. A method of inhibiting rancidity and deterioration of a manufactured butter product which comprises incorporating in a butter product, a small amount, sufficient to inhibit rancidity and deterioration, of dimethyldithiocarbamic acid and salts thereof.

13. A method of inhibiting rancidity and deterioration of a manufactured butter product which comprises incorporating in a butter product, 0.0005–0.02% of dimethyldithiocarbamic acid and salts thereof.

14. A method of inhibiting rancidity and deterioration of a manufactured butter product which comprises incorporating in a butter product, a small amount, sufficient to inhibit rancidity and deterioration, of diethyldithiocarbamic acid and salts thereof.

15. A method of inhibiting rancidity and deterioration of a manufactured butter product which comprises incorporating in a butter product, 0.0005–0.02% of diethyldithiocarbamic acid and salts thereof.

FREDERIK DIRK TOLLENAAR.

References Cited in the file of this patent

UNITED STATES PATENTS

| Number | Name | Date |
| --- | --- | --- |
| 2,043,258 | Missbach | June 9, 1936 |
| 2,154,341 | Martin | Apr. 11, 1939 |
| 2,336,928 | Denny | Dec. 14, 1943 |